US010479845B2

(12) United States Patent
Gu et al.

(10) Patent No.: US 10,479,845 B2
(45) Date of Patent: Nov. 19, 2019

(54) PROCESS FOR PREPARING A HALOGENATED ELASTOMER WITH IMPROVED MOONEY VISCOSITY STABILITY

(71) Applicant: ExxonMobil Chemical Patents Inc., Baytown, TX (US)

(72) Inventors: Leming Gu, Pearland, TX (US); Stephen T. Dalpe, Houston, TX (US); Mauritz Kelchtermans, Leefdaal (BE); Sunny Jacob, Seabrook, TX (US); John A. Clark, Seabrook, TX (US); Michael F. McDonald, Jr., Kingwood, TX (US); Torri L. Rose, Humble, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/500,941

(22) PCT Filed: Sep. 11, 2015

(86) PCT No.: PCT/US2015/049641
§ 371 (c)(1),
(2) Date: Feb. 1, 2017

(87) PCT Pub. No.: WO2016/053594
PCT Pub. Date: Apr. 7, 2016

(65) Prior Publication Data
US 2017/0226238 A1 Aug. 10, 2017

Related U.S. Application Data
(60) Provisional application No. 62/057,392, filed on Sep. 30, 2014.

(51) Int. Cl.
*C08F 8/22* (2006.01)
*C08K 5/13* (2006.01)
(Continued)

(52) U.S. Cl.
CPC ............... *C08F 8/22* (2013.01); *C08K 5/13* (2013.01); *C08K 5/134* (2013.01); *C08K 5/3435* (2013.01); *C08F 2810/50* (2013.01)

(58) Field of Classification Search
CPC ........ C08L 23/28; C08L 23/283; C08L 15/02; C08K 5/13; C08K 5/32; C08K 5/3412; C08K 5/3432; C08F 8/22; C08C 19/14
See application file for complete search history.

(56) References Cited

U.S. PATENT DOCUMENTS

| 2,821,515 A | * | 1/1958 | Jaros | ........................ C08F 10/00 523/328 |
| 4,384,072 A | * | 5/1983 | Newman | .................. C08C 19/12 525/356 |

(Continued)

FOREIGN PATENT DOCUMENTS

| CN | 105218719 B | * | 6/2017 |
| WO | 2013/011017 A | | 1/2013 |

(Continued)

OTHER PUBLICATIONS

Machine translated English language equivalent of CN 105218719 (Jun. 2017, 12 pages).*
Human translation of JP 01306443 (1989, 15 pages).*

*Primary Examiner* — Brieann R Johnston

(57) ABSTRACT

This invention relates to a method of preparing a brominated elastomer having a stabilized Mooney viscosity. The method includes polymerizing isomonoolefins and at least one polymerizable unit to obtain an elastomer/polymer; brominating the elastomer/polymer to form a brominated elastomer effluent; neutralizing the brominated elastomer effluent (Continued)

to form a neutralized effluent; volatizing off the hydrocarbon solvent; and recovering a brominated elastomer. In at least one point of the process, preferably prior to any significant temperature change in the brominated polymer, a Mooney stabilizer is added into the system. Portions of the Mooney stabilizer may be added at multiple points into the process.

10 Claims, 4 Drawing Sheets

(51) Int. Cl.
| | |
|---|---|
| C08K 5/134 | (2006.01) |
| C08L 23/28 | (2006.01) |
| C08F 210/10 | (2006.01) |
| C08F 210/12 | (2006.01) |
| C08F 236/08 | (2006.01) |
| C08K 5/3435 | (2006.01) |

(56) References Cited

U.S. PATENT DOCUMENTS

| | | |
|---|---|---|
| 5,569,723 A | 10/1996 | Baade et al. |
| 5,670,582 A | 9/1997 | Chung et al. |
| 5,681,901 A | 10/1997 | Newman |
| 6,552,108 B1 | 4/2003 | Wang et al. |
| 7,700,695 B2 | 4/2010 | Ashiura et al. |
| 8,316,904 B2 | 11/2012 | Soeda et al. |
| 9,127,137 B2 * | 9/2015 | Leiberich .................. C08F 8/22 |
| 2010/0009778 A1 | 1/2010 | Rajagopalan et al. |

FOREIGN PATENT DOCUMENTS

| | | |
|---|---|---|
| WO | 2015/130391 | 9/2015 |
| WO | 2015/130392 | 9/2015 |

* cited by examiner

PROCESS FOR PREPARING A HALOGENATED ELASTOMER WITH IMPROVED MOONEY VISCOSITY STABILITY

PRIORITY CLAIM TO RELATED APPLICATIONS

This present application is a National Stage Application of International Application No. PCT/US2015/049641 filed Sep. 11, 2015, which claims the benefit of and priority to U.S. Provisional Application Ser. No. 62/057,392 filed Sep. 30, 2014, the disclosures of which are is fully incorporated herein by their its references.

FIELD OF THE INVENTION

The present invention relates to a halogenated polymer having improved Mooney viscosity stability and a method of obtaining such a polymer. More particularly, the present invention is directed to a method of producing a halogenated polymer using a halogen regeneration process wherein the resulting polymer has improved Mooney viscosity stability over time.

BACKGROUND OF THE INVENTION

The regenerative halogenation process is accomplished by contacting a polymer, which has been dissolved in a solvent, a halogenating agent, and an emulsion. The halogenating agent includes but is not limited to molecular bromine, bromine chloride, hydrogen bromide, sodium bromide, or a mixture thereof. The emulsion is a mixture of a water soluble oxidizing agent capable of converting hydrogen halide to a free halogen, an emulsifying agent, an organic solvent, and water. The halogenated polymer is recovered from the mixture. More information about known regenerative halogenation processes is disclosed in U.S. Pat. Nos. 5,681,901 and 5,569,723.

While halogenated polymers manufactured using the regenerative process yield a greater maximum theoretical halogenation utilization compared to conventional halogenation methods, the regenerative process results in increased levels of Mooney viscosity growth of the polymers when compared with polymers halogenated by the conventional methods. Mooney viscosity growth, or Mooney growth, can lead to unsatisfactory processability of compound formulations, such as innerliner formulations. Unlike bromobutyl polymers, chlorobutyl polymers generally do not experience the same degree of increasing Mooney viscosity as bromobutyl polymers due to the greater bonding strength of chlorine and the associated backbone carbon, as compared to bromine, to the polymer structure. FIG. 3 shows the change in Mooney viscosity for both conventionally produced bromobutyl and prior bromine regenerative produced bromobutyl. As seen in FIG. 3, all bromobutyl polymers undergo some degree of increase in the Mooney viscosity as the polymer ages. For bromine regenerative produced bromobutyl, the slope of the increase in Mooney viscosity is greater. For instance, Mooney viscosity growth of polymers prepared by regeneration is about twice that of polymers prepared by conventional methods stored in warehouse conditions for about 2.5 years (approximated by an Oven Aging Test described later herein). While a small increase in polymer Mooney viscosity does not negatively alter the products made using the polymer, or alter any manufacturing processes using the polymer, accelerated Mooney viscosity growth reduces the shelf life of the halogenated polymer.

U.S. Ser. No. 61/946,018, filed on Feb. 28, 2014, discloses adding free radical scavengers to the final polymers produced by the conventional and bromine regeneration processes to suppress the Mooney viscosity growth. U.S. Ser. No. 61/946,035, filed on Feb. 28, 2014, discloses adding an ionomer stabilizer to the final elastomeric nanocomposite to suppress the Mooney growth. There is still a need to modify the regenerative halogenation process known in the art whereby the resulting polymer has a reduced Mooney viscosity growth.

SUMMARY OF THE INVENTION

The present invention is directed to a process for making an elastomeric composition having improved characteristics over previously known similar compositions.

This invention is directed to a method of preparing a brominated elastomer. The method comprises polymerizing a $C_4$ to $C_7$ isomonoolefin and at least one monomer or other polymerizable unit to obtain a $C_4$ to $C_7$ isomonoolefin derived elastomer; contacting the $C_4$ to $C_7$ isomonoolefin derived elastomer with a halogenating agent and an emulsion in a bromination unit to form a brominated elastomer effluent; neutralizing the brominated elastomer effluent with a neutralizing agent and water to form a neutralized effluent; volatizing a hydrocarbon solvent from the neutralized effluent to form a brominated elastomer slurry; and recovering a brominated elastomer from the brominated elastomer slurry. To suppress or reduce the Monney viscosity growth of the recovered brominated elastomer, a Mooney stabilizer is added to the process before the effluent or stream containing the brominated elastomer undergoes a significant temperature change. The stabilizer may be present during neutralization and should be in present in the neutralized effluent so prior to volatizing of the hydrocarbon solvent. Preferably, the recovered brominated elastomer has a Mooney viscosity value that does not increase by more than 17 Mooney units for up to one year when stored at 33° C. In another embodiment, the recovered brominated elastomer has a Mooney viscosity value that does not increase by more than 15 Mooney units for up to one year when stored at 33° C. In another embodiment, the recovered brominated elastomer has a Mooney viscosity value that does not increase by more than 11.5 Mooney units for up to nine months when stored at 33° C.

This invention is also directed to a method of preparing a brominated elastomer, the method comprising polymerizing a $C_4$ to $C_7$ isomonoolefin and at least one additional polymerizable monomer or unit, such as isoprene or alkylstyrene, to obtain a $C_4$ to $C_7$ isomonoolefin derived elastomer; adding a first portion of a Mooney stabilizer to the $C_4$ to $C_7$ isomonoolefin derived elastomer; contacting the $C_4$ to $C_7$ isomonoolefin derived elastomer with a halogenating agent and an emulsion in a bromination unit to form a brominated elastomer effluent, wherein an optional portion of the Mooney stabilizer is added to the bromination unit; adding an optional portion of the Mooney stabilizer to the brominated elastomer effluent; neutralizing the brominated elastomer effluent with a neutralizing agent and water to form a neutralized effluent, wherein an optional portion of the Mooney stabilizer is added to the neutralized effluent; volatizing a hydrocarbon solvent from the neutralizing effluent to form a brominated elastomer slurry; recovering a brominated elastomer from the brominated elastomer slurry, wherein an optional portion of the Mooney stabilizer is added to the brominated elastomer.

Furthermore, this invention is directed to a brominated elastomer comprised from a $C_4$ to $C_7$ isomonoolefin and at least one monomer or polymerizable unit to obtain a $C_4$ to $C_7$ isomonoolefin derived elastomer, the elastomer further having 0.001 to 0.2 mol % allylic alcohol, wherein the Mooney viscosity of the brominated elastomer does not increase by more than about 15 Mooney units for up to about 10 days at 80° C. via an Oven Aging Test or the Mooney viscosity of the brominated elastomer does not increase by more than about 15 Mooney viscosity units for up to a year when stored at 33° C.

BRIEF DESCRIPTION OF THE DRAWINGS

The invention will be described by way of example and with reference to the accompanying drawings in which.

DETAILED DESCRIPTION OF THE INVENTION

Figure 3:
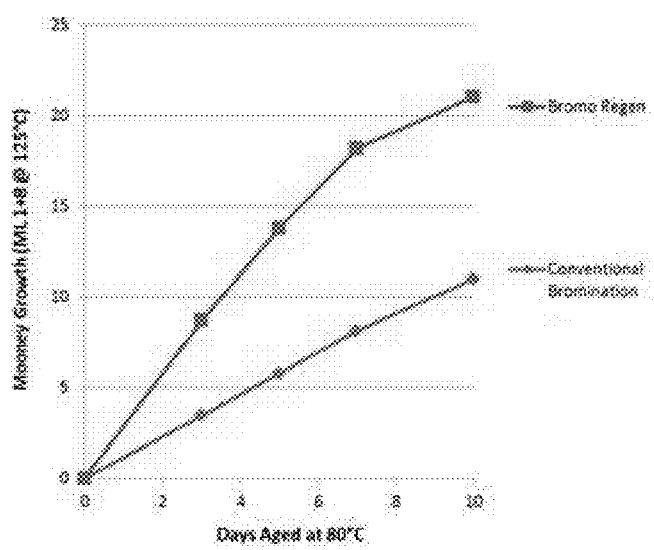
FIG. 3 shows the Mooney viscosity growth of polymers produced by conventional bromination and prior regenerative bromination processes.

The present invention is directed to a regenerative halogenation process wherein the resulting halogenated polymer experiences a slower Mooney viscosity growth after a period of time. All polymers, due to the active sites in the polymer structure, experience occasional inter-chain coupling between the polymer chains, whereby due to time and temperature the molecular weight increases. This coupling produces larger polymer chains present in the mass, which thereby increases the Mooney viscosity which is related to molecular weight of the polymer mass, as seen in FIG. 3. The coupling also affects the Z-average molecular weight (Mz) and molecular weight distribution (MWD) due to the presence of the newly created larger polymers.

As seen in FIG. 3, the increase in Mooney viscosity is greater for brominated polymers prepared by known bromine regenerative processes than for conventionally brominated polymers. The present invention is directed to obtaining a halogenated polymer produced using an improved regenerative halogenation process wherein the polymer has a Mooney viscosity growth comparable to that of a conventionally halogenated polymer.

Definitions

Definitions applicable to the presently described invention are as described below.

Polymer may be used to refer to homopolymers, copolymers, interpolymers, terpolymers, etc. Likewise, a copolymer may refer to a polymer comprising at least two monomers, optionally with other monomers. When a polymer is referred to as comprising a monomer, the monomer is present in the polymer in the polymerized form of the monomer or in the polymerized form of a derivative from the monomer (i.e., a monomeric unit). However, for ease of reference the phrase comprising the (respective) monomer or the like is used as shorthand. Likewise, when catalyst components are described as comprising neutral stable forms of the components, it is well understood by one skilled in the art, that the ionic form of the component is the form that reacts with the monomers to produce polymers.

Elastomer refers to any polymer or blend of polymers consistent with the ASTM D1566 definition: "a material that is capable of recovering from large deformations, and can be, or already is, modified to a state in which it is essentially insoluble, if vulcanized, (but can swell) in a solvent." Elastomers are often also referred to as rubbers; the term elastomer may be used herein interchangeably with the term rubber. Preferred elastomers have a melting point that cannot be measured by Differential Scanning calorimetry (DSC) or if it can be measured by DSC is less than 40° C., or preferably less than 20° C., or less than 0° C. Preferred elastomers have a Tg of −50° C. or less as measured by DSC.

Mooney viscosity or viscosity means the viscosity measure of rubbers. It is defined as the shearing torque resisting rotation of a cylindrical metal disk (or rotor) embedded in rubber within a cylindrical cavity. The dimensions of the shearing disk viscometer, test temperatures, and procedures for determining Mooney viscosity are defined in ASTM D1646. Mooney viscosity is measured in Mooney units and reported herein as ML 1+8 at 125° C.

Isoolefin refers to any olefin monomer having at least one carbon having two substitutions on that carbon. Multiolefin refers to any monomer having two or more double bonds. In a preferred embodiment, the multiolefin is any monomer comprising two conjugated double bonds such as a conjugated diene like isoprene.

Isobutylene based elastomer or polymer refers to elastomers or polymers comprising at least 70 mol % repeat units from isobutylene.

Elastomer

Useful elastomeric polymers for this invention include elastomers derived from a mixture of monomers, the mixture having at least (1) a $C_4$ to $C_7$ isoolefin monomer component with (2) at least one multiolefin or other polymerizable monomer component. The isoolefin is present in a range from 70 to 99.5 wt % by weight of the total monomers in any embodiment, or 85 to 99.5 wt % in any embodiment. The multiolefin derived or other polymerizable monomer component is present in amounts in the range of from 30 to about 0.5 wt % in any embodiment, or from 15 to 0.5 wt % in any embodiment, or from 8 to 0.5 wt % in any embodiment.

The isoolefin is a $C_4$ to $C_7$ compound, non-limiting examples of which are compounds such as isobutylene, isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. The multiolefin is a $C_4$ to $C_{14}$ multiolefin such as isoprene, butadiene, 2,3-dimethyl-1,3-butadiene, myrcene, 6,6-dimethyl-fulvene, hexadiene, cyclopentadiene, and piperylene. Other polymerizable monomers such as styrene and dichlorostyrene are also suitable for homopolymerization or copolymerization in butyl rubbers.

Preferred elastomers useful in the practice of this invention include isobutylene-based copolymers. As stated above, an isobutylene based elastomer or a polymer refers to an elastomer or a polymer comprising at least 70 mol % repeat units from isobutylene and at least one other polymerizable unit. These polymers are also conventionally referred to as butyl rubbers. One butyl rubber polymer of the invention is obtained by reacting isobutylene with 0.5 to 8 wt % isoprene, or reacting isobutylene with 0.5 wt % to 5.0 wt % isoprene—the remaining weight percent of the polymer being derived from isobutylene.

Other elastomeric polymers of the present invention are derived from at least one random copolymer comprising a $C_4$ to $C_7$ isoolefin and an alkylstyrene comonomer. The isoolefin may be selected from any of the above listed $C_4$ to $C_7$ isoolefin monomers, and is preferably an isomonoolefin, and in any embodiment may be isobutylene. The alkylstyrene may be para-methylstyrene, containing at least 80%, more alternatively at least 90%, preferably 95%, by weight of the para-isomer and can also include functionalized terpolymers. The random copolymer has at least one or more of the alkyl substituents groups present in the styrene monomer units. In any embodiment, the elastomer comprises random polymers of isobutylene and 0.5 to 20 mol % para-methylstyrene.

In any embodiment of the invention, other useful elastomers include other unsaturated copolymers of isoolefins. Non-limiting examples of such unsaturated polymers are poly(styrene-co-butadiene), star-branched isobutylene-isoprene, star-branched isobutylene-p-methylstyrene, isobutylene-isoprene-alkylstyrene block polymers and random polymers of isobutylene-isoprene-alkylstyrene.

The above polymers may be produced by any suitable means known in the art, and the invention is not herein limited by the method of producing the polymer. The polymers are traditionally produced in either a slurry polymerization process or a solution polymerization process. If the polymer is produced in a slurry polymerization process whereby the polymer precipitates out of the reaction medium, then the polymer is dissolved into a suitable solvent, i.e., the creation of a polymer cement, prior to halogenation. For polymers produced via a solution process, after removal of unreacted monomers and removal or neutralization of unused catalysts, the same polymer containing solution, or polymer cement, may be used for halogenation. The polymer cement contains 1 to 70 wt % polymer, alternatively 10 to 60 wt % polymer, alternatively 10 to 50 wt % polymer, or alternatively 10 to 40 wt % polymer.

Method of Preparing Halogenated Elastomers

One method of preparing bromobutyl elastomers via bromine regeneration is described in detail in U.S. Pat. No. 5,670,582. Isobutylene based polymers having unsaturation in the polymer backbone, such as isobutylene-isoprene polymers, may be readily halogenated using an ionic mechanism during contact of the polymer with a halogen source, e.g., molecular bromine or chlorine, and at temperatures in the range of from about 20° C. to 80° C. Isobutylene based polymers having no unsaturation in the polymer backbone, such as isobutylene-alkylstyrene polymers, undergo halogenation under free radical halogenation conditions, i.e., in the presence of white actinic light or by inclusion of an organic free radical initiator in the reaction mixture, and at temperatures of 20° C. to 90° C.

As discussed above, conventional regenerative halogenation process occurs by contacting a polymer solution with a halogenating agent and an emulsion containing an oxidizing agent. The oxidizing agent interacts with hydrogen halide created during halogenation, converting the halogen back into a form useful for further halogenation of the polymer thereby improving the halogen utilization.

Figure 1:
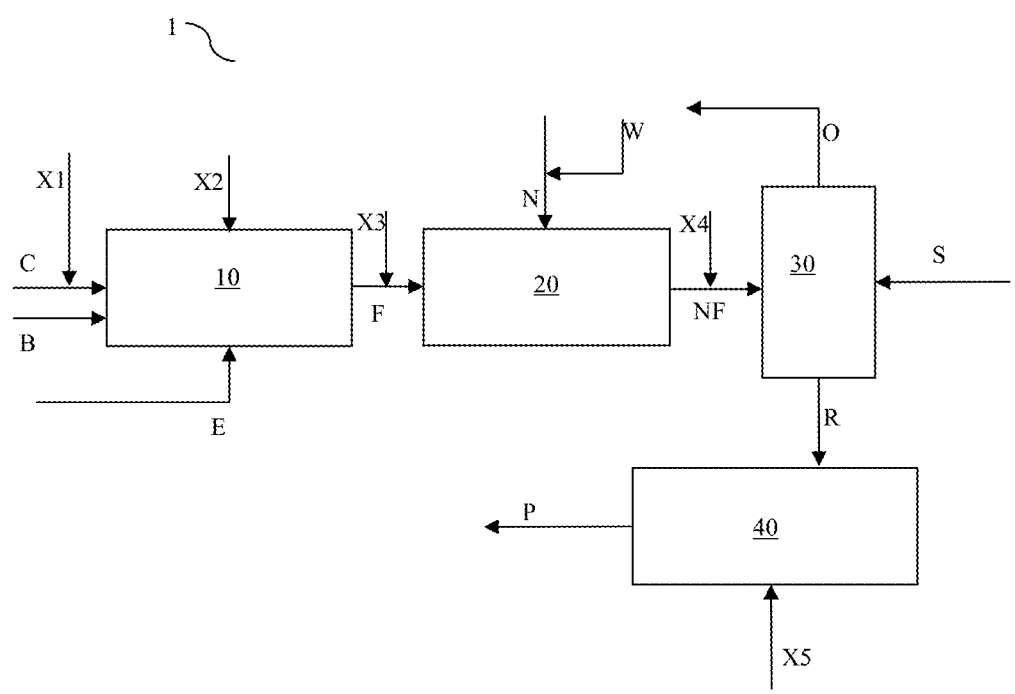
FIGS. 1 and 2 show the regenerative halogenation processes of the invention.

The regenerative bromination process 1 of the invention is illustrated in FIG. 1. Polymer cement is fed per feedstream C into a bromination unit 10. The bromination unit 10 may be any conventional means permitting the desired reaction; it may be a mixed flow stirred tank, a conventional stirred tank, a packed tower, or a pipe with sufficient flow and residence time to permit the desired reaction to occur. The halogenating agent, in the form of molecular bromine, bromine chloride, hydrogen bromide, sodium bromide, or a mixture thereof is fed per feedstream B into the bromination unit 10.

An emulsion is fed per feedstream E into the bromination unit 10. The emulsion is composed of the oxidizing agent, water, solvent, and an emulsifying agent, such as a surfactant. The emulsion is prepared by providing a 10 to 80 wt %, alternatively a 20 to 70 wt % or 25 to 45 wt %, solution of the oxidizing agent in water and mixing this with a solvent and an emulsifying agent under suitable mixing conditions to form a stable emulsion. The emulsion may be achieved by mixing the aqueous phase into the emulsifying agent containing solvent, or by mixing the oxidizing agent with the emulsifying agent first and then combining with the solvent. The amount of oxidizing agent is in the range of 0.1 to 3, alternatively 0.25 to 3, or alternatively 0.5 to 3 moles of active oxidizing agent per mole of halogenating agent. Use of an oxidizing agent during bromination increases bromine utilization to about 70 to 85%.

Oxidizing agents useful in the process are materials which contain oxygen, preferably water soluble oxygen containing agents. Suitable agents include peroxides and peroxide forming substances as exemplified by the following substances: hydrogen peroxide, organic hydrogen peroxide, sodium chlorate, sodium bromate, sodium hypochlorite or bromite, oxygen, oxides of nitrogen, ozone, urea peroxidate, acids such as pertitanic perzirconic, perchromic, permolybdic, pertungstic, perunanic, perboric, perphosphoric, perpyrophosphoric, persulfates, perchloric, perchlorate and periodic acids. Of the foregoing, hydrogen peroxide and hydrogen peroxide-forming compounds, e.g., per-acids and sodium peroxide, have been found to be highly suitable for carrying out the desired halogen regeneration.

The choice of solvent for the emulsion may be any solvent suitable for use or used in forming the polymer cement; in one embodiment, the solvent is selected to be the same solvent used to form the polymer cement. Suitable solvents include hydrocarbons such as pentane, hexane, heptane, and the like, inert halogen containing hydrocarbons such as mono-, di-, or tri-halogenated $C_1$ to $C_6$ paraffinic hydrocarbon or a halogenated aromatic hydrocarbon such as methyl chloride, methylene chloride, ethyl chloride, ethyl bromide, dichloroethane, n-butyl chloride, and monochlorobenzene or mixtures of the hydrocarbon and inert halo-hydrocarbon solvent. Furthermore, the solvent may be one combination of the solvents provided herein, including isomers thereof.

The emulsion via feedstream E may be introduced into the bromination unit 10 at the beginning of the halogenation cycle or after consumption of the bromine via halogenation of the polymer has begun. The bromination reaction and the bromine regeneration reaction occurs in the range of 20° C. to 90° C. for a time sufficient to complete bromination of the polymer. When molecular bromine is the halogenating agent introduced via feed stream B, bromine consumption is indicated by a color change of the reaction mixture from a reddish brown to a light tan or amber color. Following sufficient reaction time in the bromination unit 10, the bromination effluent, stream F, exiting the bromination unit 10, is neutralized by blending the effluent stream F with a neutralization feed stream N, optionally comprising dilution water W, in a neutralization unit 20. Heat is neither introduced nor removed from the effluent F prior to neutralization and any change in temperature of the stream is due to the heat of reaction of neutralization. In an embodiment, heat may be introduced or removed prior to neutralization.

Per prior known neutralization methods, the neutralized effluent stream exiting the neutralization unit 20, NF, is sent to a slurry (or flash) tank 30 to recover the polymer from the neutralized effluent in which the now-brominated polymer remains dissolved therein. In an embodiment, multiple slurry (or flash) tanks can be present in this stage of the process and may be operated in series or in parallel. Steam S, at temperatures from 120° C. to 200° C., preferably about 150° C. to 180° C., is introduced into the slurry tank 30 to volatize the hydrocarbon solvents, the volatized solvent being removed by the overhead stream O. Temperatures in the slurry tank 30 are in the range of 80° C. to 200° C., or alternatively in the range of 90° C. to 120° C. The temperature of the components in the slurry tank 30, including the polymer in the formed slurry, are dependent on the amount and temperature of the steam S mixed with the neutralized effluent stream NF to achieve removal of the hydrocarbon solvent. The polymer temperature will be in the range of 100° C. to 175° C.

The slurry tank overhead stream O may be sent to a separator wherein the volatized hydrocarbon solvent is separated from any water contained in the overhead stream; the recovered hydrocarbon solvent is preferably treated and recycled back into the polymerization or bromination process. Water recovered from the separator may be recycled back into the neutralization feed stream.

Following removal of volatized solvent via overhead stream O, the slurry tank effluent R is a slurry mixture of water and precipitated brominated polymer, as well as residual components. The polymer slurry R enters an extrusion drying unit 40 for removal of the water and recovery of a polymer product stream P.

In an embodiment, additives known in the art, including but not limited to epoxidized soybean oil (also referred to as ESBO) and calcium stearate, may be added during the regenerative process. ESBO may be added in the range of about 1 to about 2 phr in unit 40 during the drying step. Calcium stearate may be added to the cement to the neutralization unit 20, and/or may be added to the slurry tank 30 to help the polymer from sticking to the equipment and to control the rubber particle size in the water slurry, and/or may be added to unit 40 during the drying step. Referring to FIG. 1, in an embodiment, antioxidants, such as Mooney stabilizers discussed below, may be added to the extrusion drying unit 40 via X5.

Figure 2:
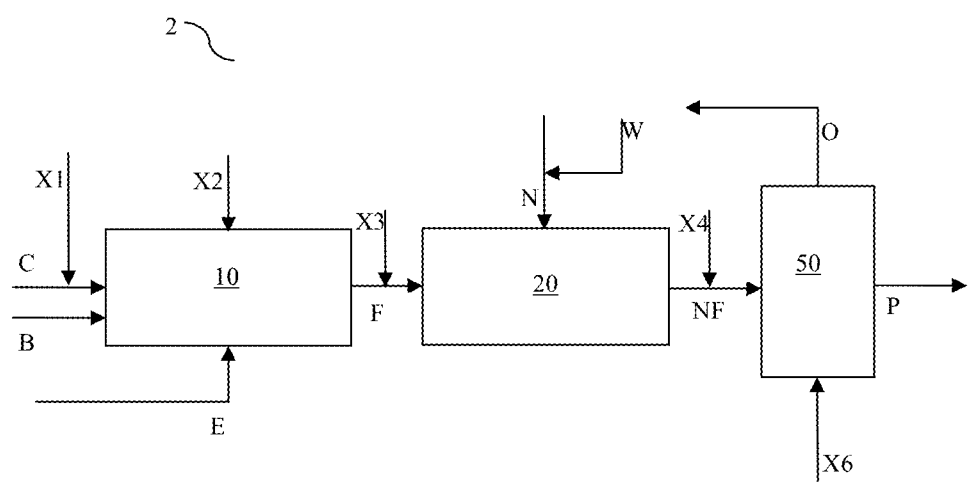

An alternative embodiment of the regenerative bromination process 2 of the invention is illustrated in FIG. 2. After the cement is neutralized in a neutralization unit 20, it is fed to a devolatizer unit 50 where volatized solvent is removed by overhead stream O, recovering polymer product stream P. In this embodiment, heat is provided as input to the devolatizer 50 via mechanical energy and/or surface heating via hot oil or any other heat transfer medium. In an embodiment, ESBO may be added to unit 50 of FIG. 2 and calcium stearate may be added to unit 20 and/or unit 50 of FIG. 2. Referring to FIG. 2, in an embodiment, antioxidants, such as Mooney stabilizers, may be added to the devolatizer unit 50 via X6.

As discussed above and depicted in FIG. 3, polymers prepared by bromine regenerative methods are susceptible to an increase in Mooney growth when stored in warehouses. To aid in understanding the accelerated Mooney viscosity growth, numerous samples were taken at various points in a conventional bromination process and in the known regenerative bromination process, sampling occurring from post polymer formation to dry polymer baling.

Figure 4:
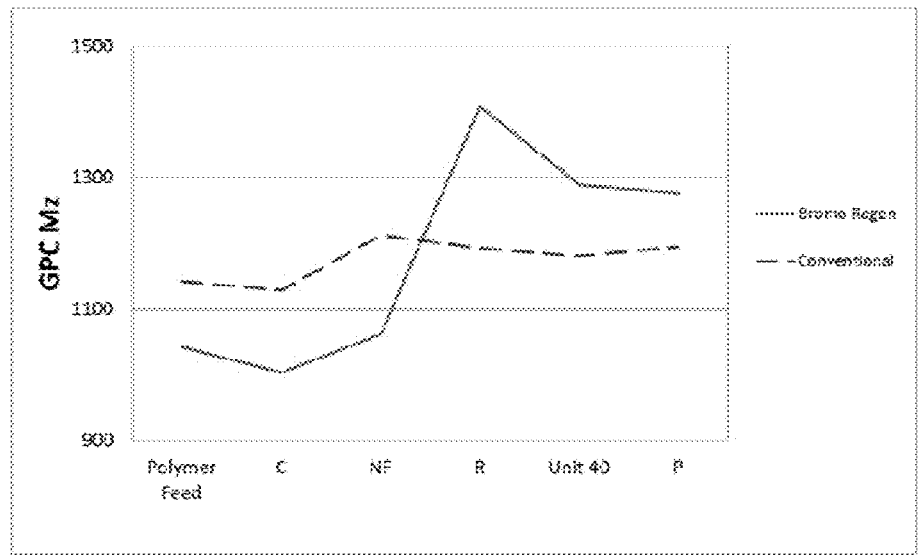
FIG. 4 shows the GPC Mz of polymers prepared by conventional bromination and prior regenerative bromination processes at different stages of the bromination process.

The inventors have discovered that Mz, measured by Gel Permeation Chromotography (GPC) methods known in the art, is useful for predicting the future Mooney viscosity growth. Accordingly, by measuring the change in Mz of a sample taken from the slurry tank 30 of FIG. 1 versus a sample taken from the neutralized cement NF, it is possible to predict the Mooney viscosity growth of the sample polymer after baling and packaging while aging in a warehouse. The Mz at various sampling points in the conventional and regenerative processes known in the art is shown in FIG. 4, corresponding to the locations indicated in FIG. 1. While the polymer samples had different Mooney viscosities, thus, the different initial Mz values, the trend line of Mooney viscosity change (based on the changed in GPC Mz) for the polymers formed by both processes are informative. As evident from the sampling data of FIG. 4, the Mz (and therefore the Mooney viscosity) of the conventionally manufacturing brominated polymer, Conventional, is relatively consistent through the process. The polymer undergoing bromination via the known regenerative bromination process, Bromo Regen, evidences a sharp increase in Mz after neutralization (labeled as "NF") and during devolatization and precipitation of the polymer into a slurry (labeled as "R"). The distinct process change at this point is a change in temperature of the polymer, from a range of 20° C. to 80° C. to a range of 100° C. to 120° C. and the polymer is exposed to high temperature steam used for volatizing/removing the hydrocarbon solvent.

While not wishing to be bound to a single theory for this molecular weight/viscosity increase, Applicants believe during the regenerative bromination process, the elastomer is also oxidized by the oxidizing agent and its decomposition product of oxygen. The oxidative structures are very low in concentrations; one known resulting structure in the elastomer is allylic alcohol present in an amount of 0.001 to 0.2 mol %. When the polymer is subjected to a significant heat change, such as the slurry process following neutralization, the oxidized structures decompose creating polymeric free radicals. Unhindered, the radicals generate in-situ formation of crosslinked networks in the polymer of sufficient quantity to evidence the increase in molecular weight, Mz, and Mooney viscosity.

Mooney Stabilizers

To address the issue of generated polymeric free radicals during the bromine regenerative process, a free-radical stabilizer, free-radical scavenger, or antioxidant, collectively referred to herein as a "Mooney stabilizer" or "stabilizer", is incorporated into the polymer or polymer slurry prior to the point of creation of free radicals or creation of an in-situ cross-linked network. The Mooney stabilizer may be oil-soluble or a water compatible compound, with a preference for an oil-soluble compound including but not limited to a hexane-soluble compound.

Suitable Mooney stabilizers include, but are not limited to, sterically hindered nitroxyl ethers, sterically hindered nitroxyl radicals, butylated hydroxytoluene (BHT), hydroxyhydrocinnamite, thiodipropinoate, phosphites, and combinations thereof.

The sterically hindered nitroxyl ether, according to the present invention, has, but is not limited to, the structure represented by either the formula (I) or (II), where n is a number from 1 to 10 and $R_1$ is propyl.

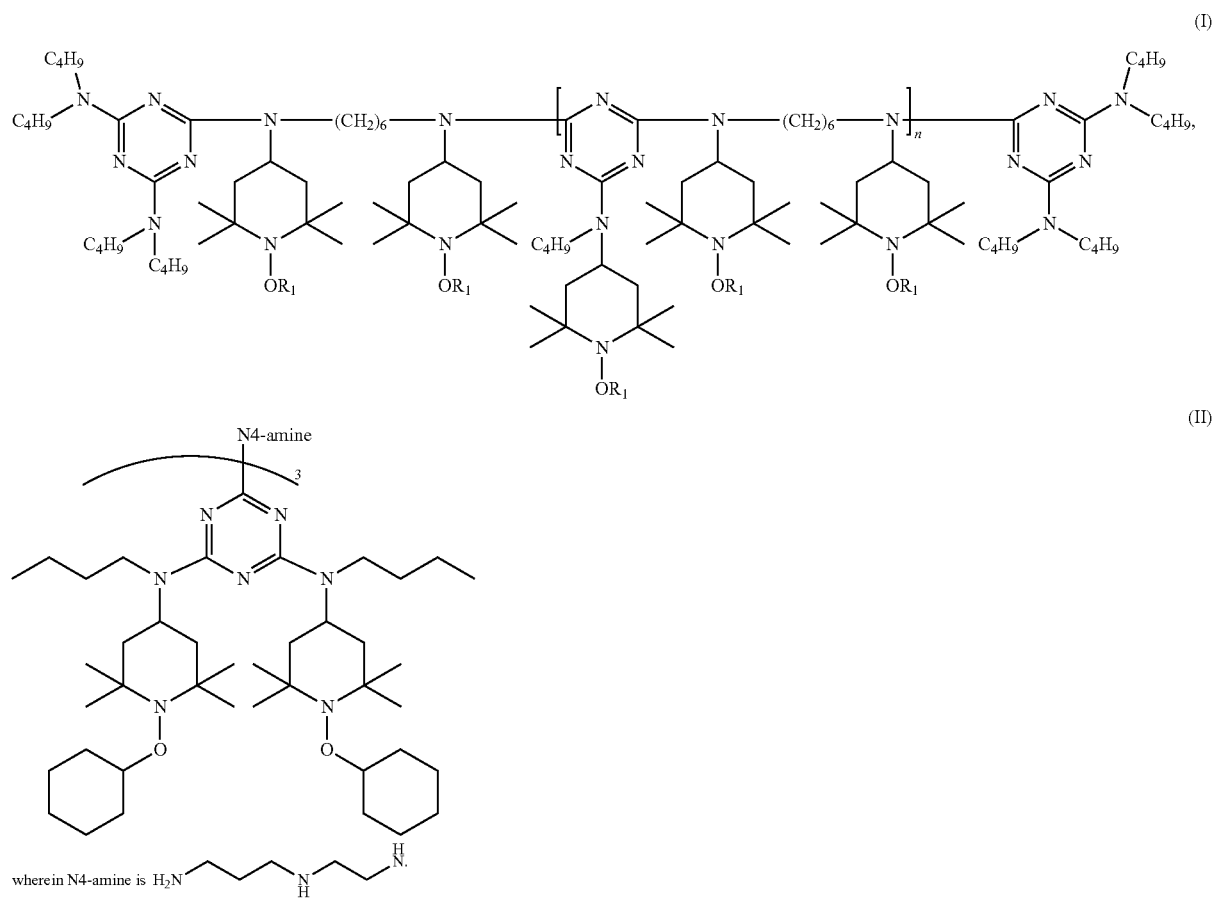

The sterically hindered nitroxyl radical has, but is not limited to, the structure represented by the formula (Ia), where n is a number from 1 to 10.

TEMPO is a term generally used in the art to refer to (2,2,6,6-tetramethylpiperidin-1-yl)oxy. The sterically hindered nitroxyl radical tested in the invention is TEMPO.

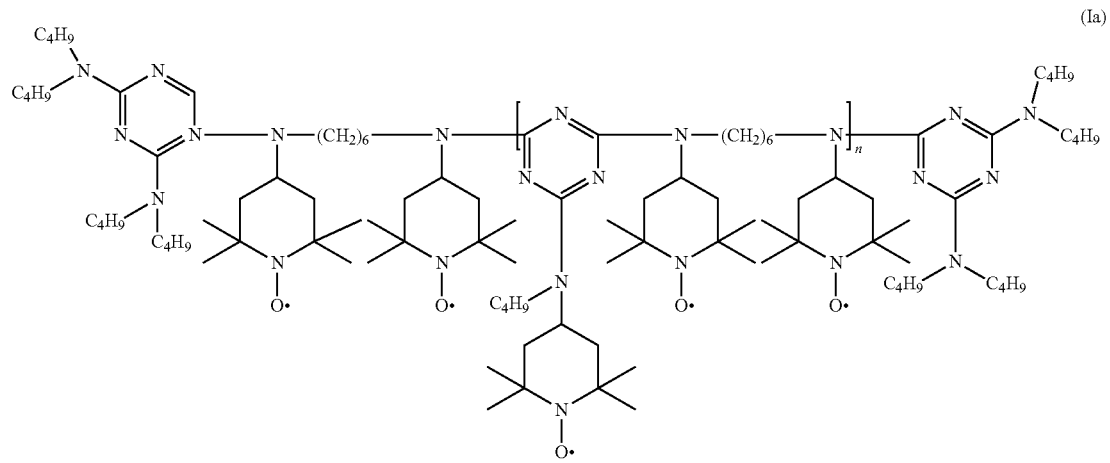

Commercially available examples of Mooney stabilizers that can be added during the preparation of bromobutyl elastomers in the present invention include, but are not limited to, TEMPO, Tinuvin™ NOR 371, Irganox PS 800, Irganox 1035, Irganox 1010, Irganox 1076, Irgaofs 168. Tinuvin™ NOR 371 is a high molecular weight hindered amine NOR stabilizer, commercially available from BASF as a plastic additive. The sterically hindered nitroxyl ether tested in the invention is Tinuvin™ NOR 371. Irganox PS 800 is commercially available from CIBA and is the trade name of didodecyl 3,3'-thiodipropionate. Irganox 1035 is commercially available from CIBA/BASF and is the trade name of thiodiethylene bis (3,5-di-tert-butyl-4-hydroxyhydrocinnamate). Irganox 1010 is commercially available from BASF and is the trade name of pentaerythritol tetrakis (3-(3,5-di-tert-butyl-4-hydroxyphenyl)propionate). Irganox 1076 is commercially available from CIBA and is the trade name of octadecyl-3-(3,5-di-tert.butyl-4-hydroxyphenyl)-propionate. The sterically hindered phenolics tested in the invention include BHT, Irganox PS 800, and Irganox 1035. Irgafos 168 is commercially available from BASF and is a general purpose phosphite. In embodiments, other Mooney stabilizers may be added to the bromobutyl-based elastomeric composition of the invention including, but not limited to, light stabilizers and UV-absorbers.

Referring to FIGS. 1 and 2, in an embodiment, the Mooney stabilizer is added via cement stream C. In another embodiment, the Mooney stabilizer is added to the bromination unit 10 via stream X2. In another embodiment, the Mooney stabilizer is added to the stream F via X3 before the effluent from the bromination unit 10 has been neutralized by stream N. In another embodiment, the Mooney stabilizer is added to the neutralization unit 20. In yet another embodiment, Mooney stabilizer is added to the stream NF via X4 after the neutralization unit 20.

In an embodiment, the Mooney stabilizer may be added in more than one location in the halogenation process, provided a portion of the Mooney stabilizer is added prior to a step involving a significant heat change. When the Mooney stabilizer is added before or during neutralization, residency time in the process provides time for the stabilizer to counter any oxidized structures and/or polymeric free radical. The Mooney stabilizer may be added to the stream C, or to the bromination unit 10, or to the bromination effluent F prior to neutralization, or to unit 20 during neutralization, or after neutralization NF, or to the extrusion drying unit 40, or the devolatizer unit 50, and any combinations thereof.

In any embodiment, the total amount of Mooney stabilizer to be added during the process of preparing the brominated elastomer is greater than about 500 ppm, greater than about 800 ppm, greater than about 1,000 ppm to less than about 2,000 ppm, to less than about 5,000 ppm, or less than about 10,000 ppm, or is in any range created by one of the above minimum amounts in combination with either of the stated maximum amounts. The ppm weight basis is the weight of the brominated polymer (whether in solution, slurry, or recovered).

TEST METHOD AND EXAMPLES

Oven Aging Test

To mimic warehouse conditions and obtain the data of FIG. 3, the polymer samples were subjected to an Oven Aging Test as described herein Immediately after recovering the polymer samples from the brominated elastomer slurry (i.e., stream P of FIG. 1 or 2) or after storing the sample for not more than 90 days at about 25° C., a sample is taken from a bale, cut into 2" cubes from the interior of the bale, wrapped in Chemfab 50-8 (Teflon coated glass, 6 mil, 12" by 36 yard roll), and double-wrapped with aluminum foil. The foil wrapped samples aged at 80° C. for 4-5 days in a conventional oven are expected to exhibit properties similar to compositions in warehouse conditions for 1 year. The foil wrapped samples aged at 80° C. for 8-10 days in a conventional oven are expected to exhibit properties similar to compositions in warehouse conditions for 2-2.5 years. It is appreciated that specific warehouse conditions can vary depending on the geographic location of the warehouse and this test is only an approximation for average warehouse conditions. During the oven aging test, the foil wrapped samples were unwrapped and about 0.25" was shaved from each side of the sample, resulting in an aged sample suitable for testing. As evidenced in FIG. 3, samples prepared by both conventional and known regenerative bromination methods showed an increase in Mooney viscosity growth over time.

Stabilizer Testing

Polymer cements of brominated isobutylene-isoprene were blended with different Mooney stabilizers at different levels to determine the effect of the stabilizers on the molecular weight stability (i.e., control of Mooney viscosity growth) of the polymer. Samples of cements were combined with the identified Mooney stabilizer, removed from a hexane solvent, and formed into a film. The films were aged for 24 hours in a nitrogen-purged oven at 90° C. The Mz of each sample were calculated before and after the oven aging. Results are set forth below in Table 1.

As the regenerative process used to prepare the polymer cements tested in Table 1 used hydrocarbon as a solvent, a selection of stabilizers were tested in Table 1 so that the stabilizer remains in the hydrocarbon phase during neutralization (the addition of stream N in FIGS. 1 and 2) and reslurry steam stripping (the addition of stream S in FIG. 1) step. It is expected that other Mooney stabilizers mentioned herein would likewise reduce Mooney growth and change in Mz. The Mooney stabilizers suitable for use in the regenerative process of the invention include but are not limited to those tested in Table 1.

TABLE 1

| Mooney stabilizer | ppm | Mz % change |
|---|---|---|
| None (control) | — | 43 |
| Irganox PS 800 | 100 | 53 |
|  | 1,000 | 38 |
|  | 10,000 | 5 |
| Irganox 1035 | 100 | 1 |
|  | 1,000 | 4.5 |
|  | 10,000 | 2.5 |
| Butylated Hydroxytoluene | 100 | 9 |
|  | 1,000 | 5 |
|  | 10,000 | 5 |
| TEMPO | 100 | −0.5 |
|  | 1000 | −0.5 |
|  | 10,000 | 15 |
| Tinuvin ™ NOR 371 | 100 | 0 |
|  | 1,000 | 11 |
|  | 10,000 | 16 |

The majority of stabilizers tested in Table 1 inhibited GPC Mz change (and therefore Mooney viscosity growth), even at 100 ppm levels. Irganox PS 800 showed unfavorably high Mooney growth at 100 ppm and 1,000 ppm levels, as compared to the control, but showed substantial decrease in Mooney at 10,000 ppm levels. Surprisingly, some stabilizers (such as TEMPO and Tinuvin™ NOR 371) showed more favorable Mooney growth suppression at lower levels of 100 ppm and 1,000 ppm levels, rather than at 10,000 ppm levels. Table 1 indicates that the amount and type of Mooney stabilizer can be selected based on the required Mooney growth suppression of the brominated elastomer.

Stabilization Trials

Polymer samples were prepared by conventional bromination and regenerative bromination processes. In both of the processes, 400 ppm BHT was added prior to the steam stripping unit 30 at feed X4 and another 400 ppm BHT was added into unit 40 at feed X5. In one run of the regenerative bromination process, an additional 800 ppm BHT was injected into the system prior to neutralization (via X3 of FIGS. 1 and 2) present in the system during neutralization. So the conventional bromination produced samples and the first regenerative bromination produced samples contained 800 ppm BHT and the samples prepared via regenerative bromination with additional BHT contained 1600 ppm BHT. All three types of samples had 1.3 wt % of epoxidized soybean oil added to the polymers after neturalization of the bromination effluent stream F.

The samples were oven aged for 9 months at 33° C.; the testing temperature selected to mimic maximum summer warehouse conditions that may be experienced by the polymers. It should be noted that as a constant temperature was maintained during testing, potential minimum winter temperature warehouse conditions are not represented in the data; one in the art would readily appreciate cooler warehouse temperatures will reduce Mooney growth tendencies of the polymer samples. Prior to oven aging the polymer samples were prepared in the same manner as described above: the samples were 2" cubes obtained from the interior of a polymer bale, wrapped in Chemfab 50-8, and double-wrapped with aluminum foil; the samples remained so wrapped for the length of the oven aging period. The Mooney viscosity of each sample was measured at the beginning of the testing period to establish a baseline Mooney viscosity value against which a delta Mooney could be determined to measure change; the actual Mooney values for each polymer sample were not identical. Samples were removed at months end for nine consecutive months and the Mooney viscosity was measured to determine the change in value.

Figure 5:
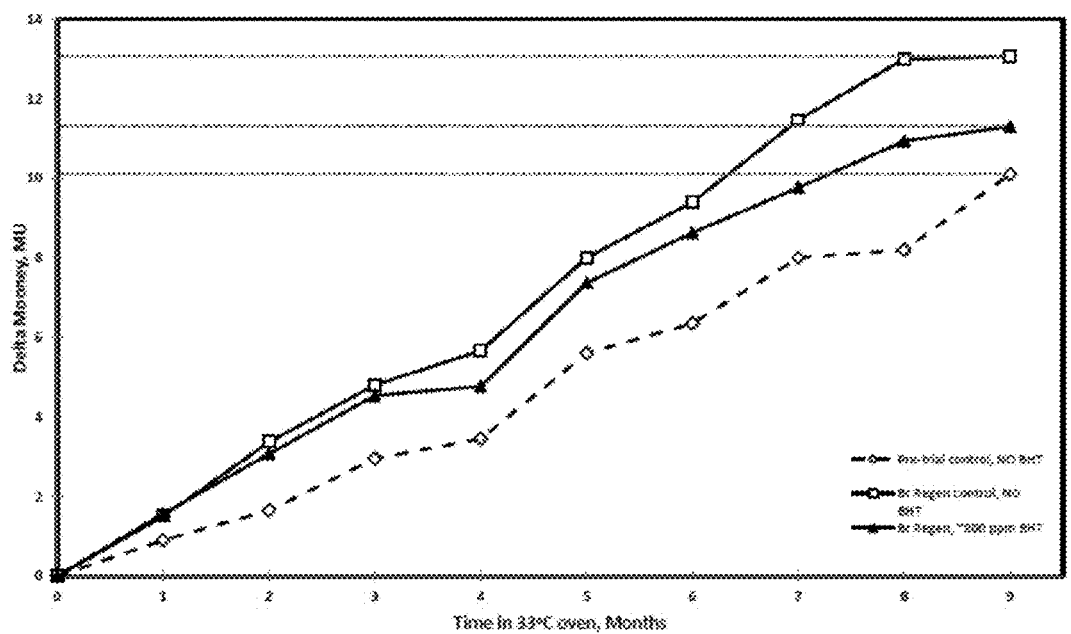
FIG. 5 shows the change in Mooney growth of polymers prepared by conventional bromination and regenerative bromination processes.

The change in the Mooney viscosity from the initial Mooney viscosity value (i.e., the delta Mooney) as measured at the end of each of the nine consecutive months is shown in FIG. 5 for the samples. The conventional bromination process samples are identified as "Pre-trial control, no additional BHT", the first regenerative bromination process samples are identified as "Br Regen control, no additional BHT" (these samples contained 800 ppm BHT), and the second regenerative bromination process samples are identified as "Br Regen, added ~800 ppm BHT" (these samples contained 1600 ppm BHT). As evident by the data in FIG. 5, all three types of samples experienced Mooney viscosity growth, and as expected samples prepared by the conventional bromination method (Pre-trial control) experienced the least Mooney viscosity growth. At nine months aging, the conventional bromination samples had an average delta Mooney of about 10.1, the regenerative bromination samples having 800 ppm BHT had an average delta Mooney of about 13.1, and the regenerative bromination samples having 1600 ppm BHT had an average delta Mooney of about 11.3. In comparing the regenerative bromination methods, when including an additional amount of Mooney viscosity stabilizer during neturalization of the brominated elastomer effluent, the Mooney viscosity growth wherein the conventional bromination method is the baseline target for Mooney value was surprisingly reduced by more than fifty percent though the temperature of the system had not yet undergone a significant temperature change. In other words, the Mooney viscosity growth delta between the conventional control sample and the "Br Regen, ~800 ppm BHT" sample is less than fifty percent of the delta between the conventional control samples and "Br Regen control" sample. While the data in FIG. 5 is only for nine months of simulated summer warehouse aging, based on mathematically reasonable projections of the delta Mooney values, the one year delta Mooney data for the 1600 ppm BHT regenerative bromination sample should not exceed 15, and will likely not exceed 13, and for the 800 ppm BHT regenerative bromination control sample, the one year delta Mooney data should not exceed 16, and will likely not exceed 15.

In comparing the data of FIG. 3 (wherein 2 to 2.5 years warehouse aging was imitated by accelerated high temperature aging) and FIG. 5, it can be seen that adding at least one portion of Mooney stabilizer prior to the brominated polymer obtained via regenerative processes undergoing a significant temperature change reduces the delta Mooney of the aged brominated polymer in comparison to brominated polymer obtained via conventional halogenation methods. The addition of Moony stabilizer may be done in a single process location or in multiple process locations.

While all the tested samples evaluated had an minimum amount of 800 ppm of BHT added prior to steam stripping, it is appreciated that other ranges of Mooney stabilizer, as low as a total of 500 ppm, may be suitable for injection in accordance with the present invention. Furthermore, it is appreciated that other Mooney stabilizers disclosed herein (in place of or in addition to BHT) can be equally or more effective at Mooney growth suppression. It is also appreciated that in addition to injecting a Mooney stabilizer before and/or after neutralization via lines X3 or X4, it is also suitable to add the Mooney stabilizer to cement via X1 or in the bromination unit 10 via X2, as depicted in FIGS. 1 and 2. In an embodiment, the Mooney stabilizer is added to the devolatizer unit 50 as depicted in FIG. 2.

Certain embodiments and features have been described using a set of numerical upper limits and a set of numerical lower limits. It should be appreciated that ranges from any lower limit to any upper limit are contemplated unless otherwise indicated. Certain lower limits, upper limits, and ranges appear in one or more claims below. All numerical values are "about" or "approximately" the indicated value, and take into account experimental error and variations that would be expected by a person having ordinary skill in the art.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other further embodiments of the invention may be devised without departing from the basic scope thereof, and the scope thereof is determined by the embodiments that follow.

Specific Embodiments

The invention, accordingly, provides the following embodiments:

Paragraph A: A method of preparing a brominated elastomer, the method comprising polymerizing a $C_4$ to $C_7$ isomonoolefin and at least one monomer or polymerizable unit to obtain a $C_4$ to $C_7$ isomonoolefin derived elastomer; contacting the $C_4$ to $C_7$ isomonoolefin derived elastomer with a halogenating agent and an emulsion in a bromination unit to form a brominated elastomer effluent; neutralizing the brominated elastomer effluent with a neutralizing agent and water to form a neutralized effluent; volatizing a hydrocarbon solvent from the neutralized effluent to form a brominated elastomer slurry; and recovering a brominated elastomer from the brominated elastomer slurry wherein a Mooney stabilizer is added to the process prior to volatizing of the hydrocarbon solvent, the addition occurring before neutralization, directly before neutralization, during neutralization, or following neutralization before volatizing of the hydrocarbon solvent.

Paragraph B: The method of Paragraph A, wherein the Mooney viscosity of the brominated elastomer, after recovering in step (f), does not increase by more than about 17 Mooney units when subject to or stored at 33° C. for one year, or does not increase by more than 15 Mooney units when subject to or stored at 33° C. for one year, or does not increase by more than 13 Mooney units when subject to or stored at 33° C. for one year, or does not increase by more than 11.5 Mooney units when subject to or stored at 33° C. for nine months.

Paragraph C: The method of Paragraph A and/or B, wherein Mooney stabilizer in amounts greater than about 500 ppm, or greater than 800 ppm, or greater than 1,000 ppm is added during the process of preparing the brominated elastomer.

Paragraph D: The method of Paragraph A and optionally Paragraph B and/or C, wherein the Mooney stabilizer is selected from at least one of a sterically hindered nitroxyl ether, sterically hindered nitroxyl radical, sterically hindered phenolics, phosphites, and combinations thereof.

Paragraph E: An article made from the brominated elastomer composition prepared by the method of Paragraph A and optionally any one or any combination of Paragraphs B to D, wherein the article is a tire innerliner or a tire bladder or is incorporated as a layer into a tire, a bladder, a hose, a belt, pneumatic spring, or vehicle body mount.

Paragraph F: The method of Paragraph A and optionally any one or any combination of Paragraphs B to E, wherein the halogenating agent is selected from at least one of molecular bromine, bromine chloride, hydrogen bromide, and sodium bromide.

Paragraph G: The method of Paragraph A and optionally any one or any combination of Paragraphs B to F, wherein the emulsion comprises an oxidizing agent, water, solvent, and surfactant.

Paragraph H: The method of Paragraph G, wherein the oxidizing agent is a material which contains oxygen selected from at least one of a water soluble oxygen containing agent, hydrogen peroxide, organic hydrogen peroxide, sodium chlorate, sodium bromate, sodium hypochlorite, sodium hypobromite, oxides of nitrogen, ozone, urea peroxidate, pertitanic perzirconic, perchromic, permolybdic, pertungstic, perunanic, perboric, perphosphoric, perpyrophosphoric, persulfates, perchloric, perchlorate, and combinations thereof.

Paragraph I: The method of Paragraph G, wherein the oxidizing agent is a water soluble oxygen containing agent.

Paragraph J: The method of Paragraph G, wherein the solvent is selected from at least one of pentane, hexane, heptane, mono-, di-, or tri-halogenated $C_1$ to $C_6$ paraffinic hydrocarbon, methyl chloride, and combinations thereof.

Paragraph K: The method of Paragraph A and optionally any one or any combination of Paragraphs B to J, wherein the bromination unit is a mixed flow stirred tank, a conventional stirred tank, a packed tower, or a pipe.

Paragraph L: A method of preparing a brominated elastomer, the method comprising polymerizing a $C_4$ to $C_7$ isomonoolefin and at least one monomer or polymerizable unit to obtain a $C_4$ to $C_7$ isomonoolefin derived elastomer; adding a first portion of a Mooney stabilizer to the $C_4$ to $C_7$ isomonoolefin derived elastomer; contacting the $C_4$ to $C_7$ isomonoolefin derived elastomer with a halogenating agent and an emulsion in a bromination unit to form a brominated elastomer effluent, wherein an optional portion of the Mooney stabilizer is added to the bromination unit; adding an optional portion of the Mooney stabilizer to the brominated elastomer effluent; neutralizing the brominated elastomer effluent with a neutralizing agent and water to form a neutralized effluent, wherein an optional portion of the Mooney stabilizer is added to the neutralized effluent; volatizing a hydrocarbon solvent from the neutralizing effluent to form a brominated elastomer slurry; recovering a brominated elastomer from the brominated elastomer slurry, wherein an optional portion of the Mooney stabilizer is added to the brominated elastomer.

Paragraph M: The method of Paragraph L, wherein the Mooney viscosity of the brominated elastomer, after recovering in step (f), does not increase by more than about 15 Mooney units when subject to 33° C. for one year.

Paragraph N: The method of Paragraph L and/or M, wherein greater than about 500 ppm of Mooney stabilizer is added during the process of preparing the brominated elastomer.

Paragraph O: The method of Paragraph L and optionally M and/or N, wherein the Mooney stabilizer is selected from at least one of a sterically hindered nitroxyl ether, sterically hindered nitroxyl radical, sterically hindered phenolics, phosphites, and combinations thereof.

Paragraph P: An article made from the brominated elastomer composition prepared by the method of Paragraph L and optionally any one or any combination of Paragraphs M to O, wherein the article is a tire innerliner or a tire bladder or is incorporated as a layer into a tire, a bladder, a hose, a belt, pneumatic spring, or vehicle body mount.

Paragraph Q: The method of Paragraph L and optionally any one or any combination of Paragraphs M to P, wherein the halogenating agent is selected from at least one of molecular bromine, bromine chloride, hydrogen bromide, and sodium bromide.

Paragraph R: The method of Paragraph L and optionally any one or any combination of Paragraphs M to Q, wherein the emulsion comprises an oxidizing agent, water, solvent, and surfactant.

Paragraph S: The method of Paragraph R, wherein the oxidizing agent is a material which contains oxygen selected from at least one of a water soluble oxygen containing agent, hydrogen peroxide, organic hydrogen peroxide, sodium chlorate, sodium bromate, sodium hypochlorite, sodium hypobromite, oxides of nitrogen, ozone, urea peroxidate, pertitanic perzirconic, perchromic, permolybdic, pertungstic, perunanic, perboric, perphosphoric, perpyrophosphoric, persulfates, perchloric, perchlorate, and combinations thereof.

Paragraph T: The method of Paragraph R, wherein the oxidizing agent is a water soluble oxygen containing agent.

Paragraph U: The method of Paragraph R, wherein the solvent is selected from at least one of pentane, hexane, heptane, mono-, di-, or tri-halogenated $C_1$ to $C_6$ paraffinic hydrocarbon, methyl chloride, and combinations thereof.

Paragraph V: The method of Paragraph L and optionally any one or any combination of Paragraphs M to U, wherein the bromination unit is a mixed flow stirred tank, a conventional stirred tank, a packed tower, or a pipe.

Paragraph W: The method of any one or any combination of the above Paragraphs wherein the at least one polymerizable unit is isoprene, styrene, alkylstyrene, or a different $C_4$ to $C_7$ isomonoolefin.

Paragraph X: A brominated elastomer derived from a $C_4$ to $C_7$ isomonoolefin and at least one polymerizable unit selected from isoprene and alkylstyrene, wherein the Mooney viscosity of the brominated elastomer does not increase by more than about 15 Mooney units for one year at 33° C.

Paragraph Y: A brominated elastomer prepared by any one or any combination of Paragraphs A to K or prepared by any one or any combination of Paragraphs L to W, or is the elastomer of Paragraph X wherein the brominated elastomer contains 0.001 to 0.2 mol % of allylic alcohol.

INDUSTRIAL APPLICABILITY

The inventive polymers can be used to make any number of articles. In one embodiment, the article is selected from tire curing bladders, tire innerliners, tire innertubes, and air sleeves. In another embodiment, the article is a hose or a hose component in multilayer hoses, such as those that contain polyamide as one of the component layers. Other useful goods that can be made using polymers of the invention include air spring bladders, seals, molded goods, cable housing, rubber-based pharmaceutical stoppers, and other articles disclosed in THE VANDERBILT RUBBER HANDBOOK, PP. 637-772 (Ohm, ed., R.T. Vanderbilt Company, Inc. 1990).

All priority documents, patents, publications, and patent applications, test procedures (such as ASTM methods), and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated.

What is claimed is:

1. A method of preparing a brominated elastomer, the method comprising:
    (a) polymerizing a $C_4$ to $C_7$ isomonoolefin and at least one monomer or other polymerizable unit to obtain a $C_4$ to $C_7$ isomonoolefin derived elastomer;
    (b) adding a first portion of a Mooney stabilizer to the $C_4$ to $C_7$ isomonoolefin derived elastomer;
    (c) contacting the $C_4$ to $C_7$ isomonoolefin derived elastomer with a halogenating agent and an emulsion in a bromination unit to form a brominated elastomer effluent, wherein an optional portion of the Mooney stabilizer is added to the bromination unit, wherein the emulsion comprises an oxidizing agent, water, solvent, and surfactant;
    (d) adding a portion of the Mooney stabilizer to the brominated elastomer effluent;
    (e) neutralizing the brominated elastomer effluent with a neutralizing agent and water to form a neutralized effluent, wherein an optional portion of the Mooney stabilizer is added to the neutralized effluent;
    (f) volatizing a hydrocarbon solvent from the neutralizing effluent to form a brominated elastomer slurry;
    (g) recovering a brominated elastomer from the brominated elastomer slurry, wherein an optional portion of the Mooney stabilizer is added to the recovered brominated elastomer.

2. The method of claim 1, wherein the Mooney viscosity of the recovered brominated elastomer does not increase by more than about 15 Mooney units when subject to 33° C. for one year.

3. The method of claim 1, wherein greater than about 500 ppm of Mooney stabilizer is added during the process of preparing the brominated elastomer.

4. The method of claim 1, wherein the Mooney stabilizer is selected from at least one of a sterically hindered nitroxyl ether, sterically hindered nitroxyl radical, sterically hindered phenolics, phosphites, and combinations thereof.

5. The method of claim 1, wherein the halogenating agent is selected from at least one of molecular bromine, bromine chloride, hydrogen bromide, and sodium bromide.

6. The method of claim 1, wherein the oxidizing agent is a material which contains oxygen selected from at least one of a water soluble oxygen containing agent, hydrogen peroxide, organic hydrogen peroxide, sodium chlorate, sodium bromate, sodium hypochlorite, sodium hypobromite, oxides of nitrogen, ozone, urea peroxidate, pertitanic perzirconic, perchromic, permolybdic, pertungstic, perunanic, perboric, perphosphoric, perpyrophosphoric, persulfates, perchloric, perchlorate, and combinations thereof.

7. The method of claim 1, wherein the oxidizing agent is a water soluble oxygen containing agent.

8. The method of claim 1, wherein the solvent is selected from at least one of pentane, hexane, heptane, mono-, di-, or tri-halogenated $C_1$ to $C_6$ paraffinic hydrocarbon, methyl chloride, and combinations thereof.

9. The method of claim 1, wherein the bromination unit is a mixed flow stirred tank, a conventional stirred tank, a packed tower, or a pipe.

10. An article made from the brominated elastomer prepared by the method of claim 1, wherein the article is a tire innerliner or a tire bladder or is incorporated as a layer into a tire, a bladder, a hose, a belt, pneumatic spring, or vehicle body mount.

* * * * *